United States Patent
Li et al.

(10) Patent No.: US 6,996,160 B2
(45) Date of Patent: Feb. 7, 2006

(54) CHANNEL GAIN ESTIMATION IN A RAKE RECEIVER USING COMPLEX WEIGHT GENERATION (CWG) ALGORITHMS

(75) Inventors: Bin Li, Ronkonkoma, NY (US); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/718,394

(22) Filed: Nov. 20, 2003

(65) Prior Publication Data

US 2004/0156423 A1 Aug. 12, 2004

Related U.S. Application Data

(60) Provisional application No. 60/428,413, filed on Nov. 22, 2002.

(51) Int. Cl.
*H04B 1/69* (2006.01)
(52) U.S. Cl. ............... 375/148; 375/140; 375/142; 375/144; 375/147; 375/226; 375/340; 375/344; 370/342; 370/500; 370/479
(58) Field of Classification Search ............... 375/140, 375/142, 144, 147, 148, 340, 344, 226; 370/342, 370/500, 479
See application file for complete search history.

(56) References Cited

U.S. PATENT DOCUMENTS

| 6,363,102 | B1 * | 3/2002 | Ling et al. | 375/147 |
| 6,393,073 | B1 * | 5/2002 | Eilts | 375/340 |
| 2001/0021236 | A1 * | 9/2001 | Song | 375/366 |
| 2002/0163956 | A1 * | 11/2002 | Seo et al. | 375/147 |
| 2002/0191578 | A1 * | 12/2002 | Bachl et al. | 370/342 |
| 2003/0147456 | A1 * | 8/2003 | Kumura | 375/148 |

FOREIGN PATENT DOCUMENTS

WO WO0336760 * 11/2003 ............. 375/140

* cited by examiner

*Primary Examiner*—Stephen Chin
*Assistant Examiner*—Jaison Joseph
(74) *Attorney, Agent, or Firm*—Volpe and Koenig, P.C.

(57) ABSTRACT

A channel estimation method which reduces the strain on resources of a Rake receiver using a complex weight gain (CWG) algorithm. In one embodiment, a non-adaptive algorithm is used to average blocks of pilot symbols from several slots. In another embodiment, an adaptive algorithm implements sliding window averaging or a recursive filter. Using a CWG algorithm reduces the memory and processor requirements of the Rake receiver.

24 Claims, 8 Drawing Sheets

CHANNEL GAIN ESTIMATION IN A RAKE RECEIVER USING COMPLEX WEIGHT GENERATION (CWG) ALGORITHMS

CROSS REFERENCE TO RELATED APPLICATION

This application claims priority from U.S. provisional application No. 60/428,413, filed Nov. 22, 2002, which is incorporated by reference as if fully set forth.

FIELD OF INVENTION

The present invention relates to wireless communication systems. More specifically, the present invention relates to the filtering of communications using a Complex Weight Generation (CWG) algorithm.

BACKGROUND OF THE INVENTION

A typical wireless communication system, such as specified in the Third Generation Partnership Project (3GPP), transmits downlink communications from a base station to one or a plurality of wireless transmit/receive units (WTRUs). An uplink communication occurs when the WTRU transmits to the Base Station (BS).

In a direct sequence Code Division Multiple Access (CDMA) transmission system, data is modulated by spreading it into a wideband radio frequency signal using a spreading code sequence. A communication system assigns different spreading codes to each user enabling them to communicate using the same radio frequency band. Receivers operate by correlating or despreading the received signal with a known spreading code sequence.

A receiver may receive time offset copies of a transmitted communication signal known as multi-path fading. The signal energy is dispersed over time due to distinct multi-paths and scattering. If the receiver has some information about the channel profile, the receiver may estimate the communication signal by combining the multi-path copies of the signal to improve performance. For example, one such method gathers signal energy by assigning correlator branches to different paths and combining their outputs constructively.

Figure 1:
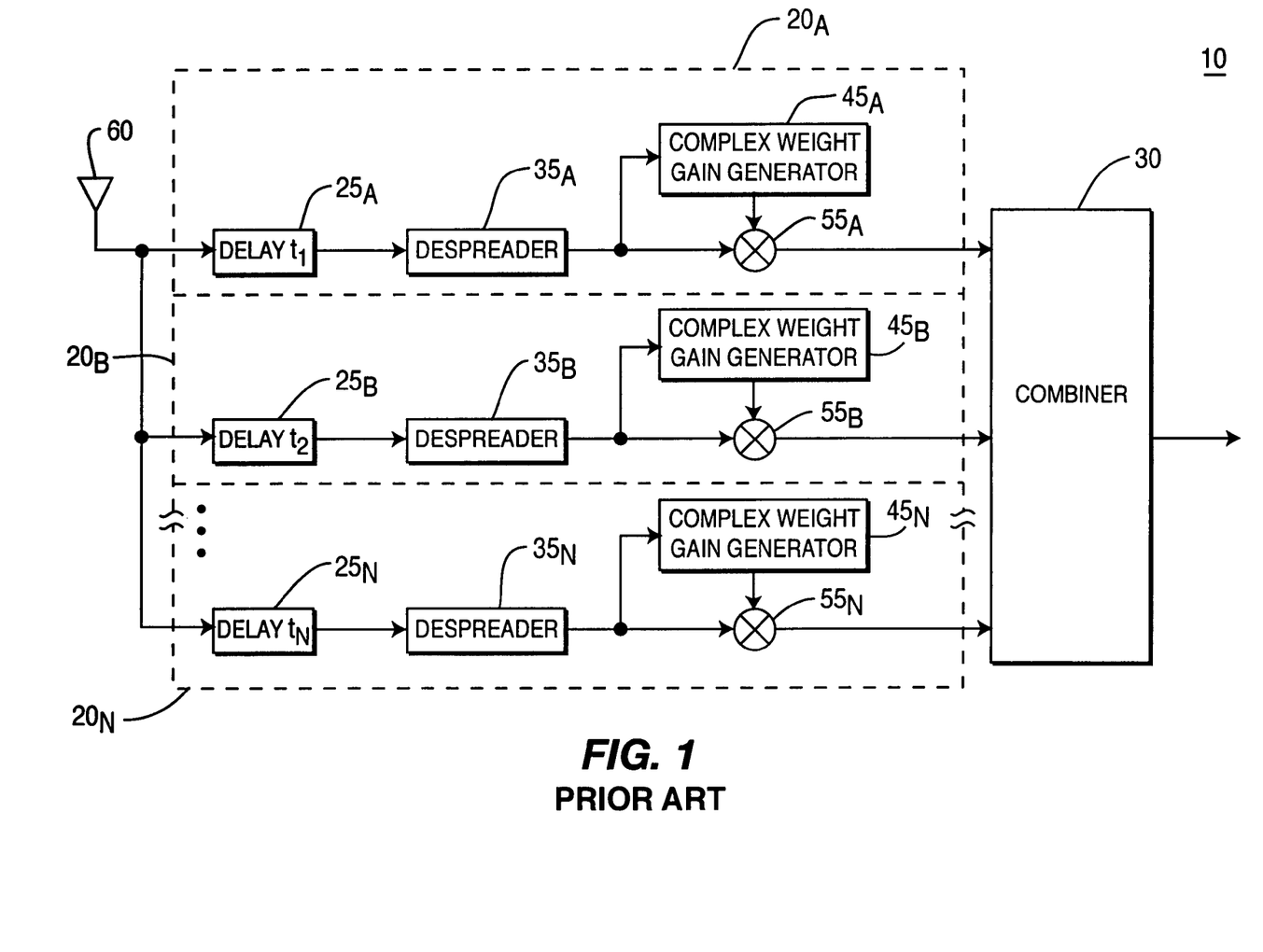
FIG. 1 is a block diagram of a conventional Rake receiver.

In a CDMA system, a Rake receiver is conventionally used. As shown in FIG. 1, a Rake receiver 10 consists of a bank of "sub-receivers" $20_A$, $20_B$ ... $20_N$ and a combiner 30. Each "sub-receiver" 20 constitutes a Rake finger, i.e., multipath, which includes a delay $25_A$, $25_B$ ... $25_N$, a despreader $35_A$, $35_B$ ... $35_N$, a complex weight generator $45_A$, $45_B$ ... $45_N$ and a demodulator (or multiplier) $55_A$, $55_B$ ... $55_N$, where the complex weight generator 45 estimates the channel gain. The channel gain is a complex parameter representing the amplitude attenuation and phase rotation of the signal received via antenna 60 and the sub-receivers 20. The demodulator (or multiplier) 55 is essentially a multiplier that multiplies the output of the despreader 35 with the complex weight provided by complex weight generator 45, whereby the output of multiplier 55 is a phase-rotation-removed and amplitude-weighted despread signal. Therefore, the combiner 30 coherently (or in co-phase) combines all signals received from all of the "sub-receivers" 20.

The Rake receiver 10 has several "fingers," one for each path. In each finger, a path delay with respect to some reference delay, such as the direct or the earliest received path, must be estimated and tracked throughout the transmission. Rake receivers are able to exploit multi-path propagation to benefit from path diversity of the transmitted signal. Using a plurality of paths, or rays, increases the signal power available to the receiver. Additionally, it provides protection against fading since several paths are unlikely to be subject to simultaneous deep fades. With suitable combining, this can improve the received signal-to-noise ratio, reduce fading and ease power control problems.

In conventional wireless communication systems, there is a significant frequency offset between the Node B and the WTRU due to imprecise oscillators used in the WTRU. This frequency offset, which translates into a phase shift over time, must be estimated and corrected in the WTRU or else a significant loss in performance will occur. There are several conventional algorithms used for differential detection to estimate the phase shift in a constant velocity WTRU. The algorithms assume that the phase shifts between any two adjacent pilot symbols are constant over the observation window. The benefits of a Rake receiver sometimes are reduced because of complex algorithms required to perform frequency offset estimation and CWG which are processor and memory intensive, and consume valuable system resources.

Figure 2:
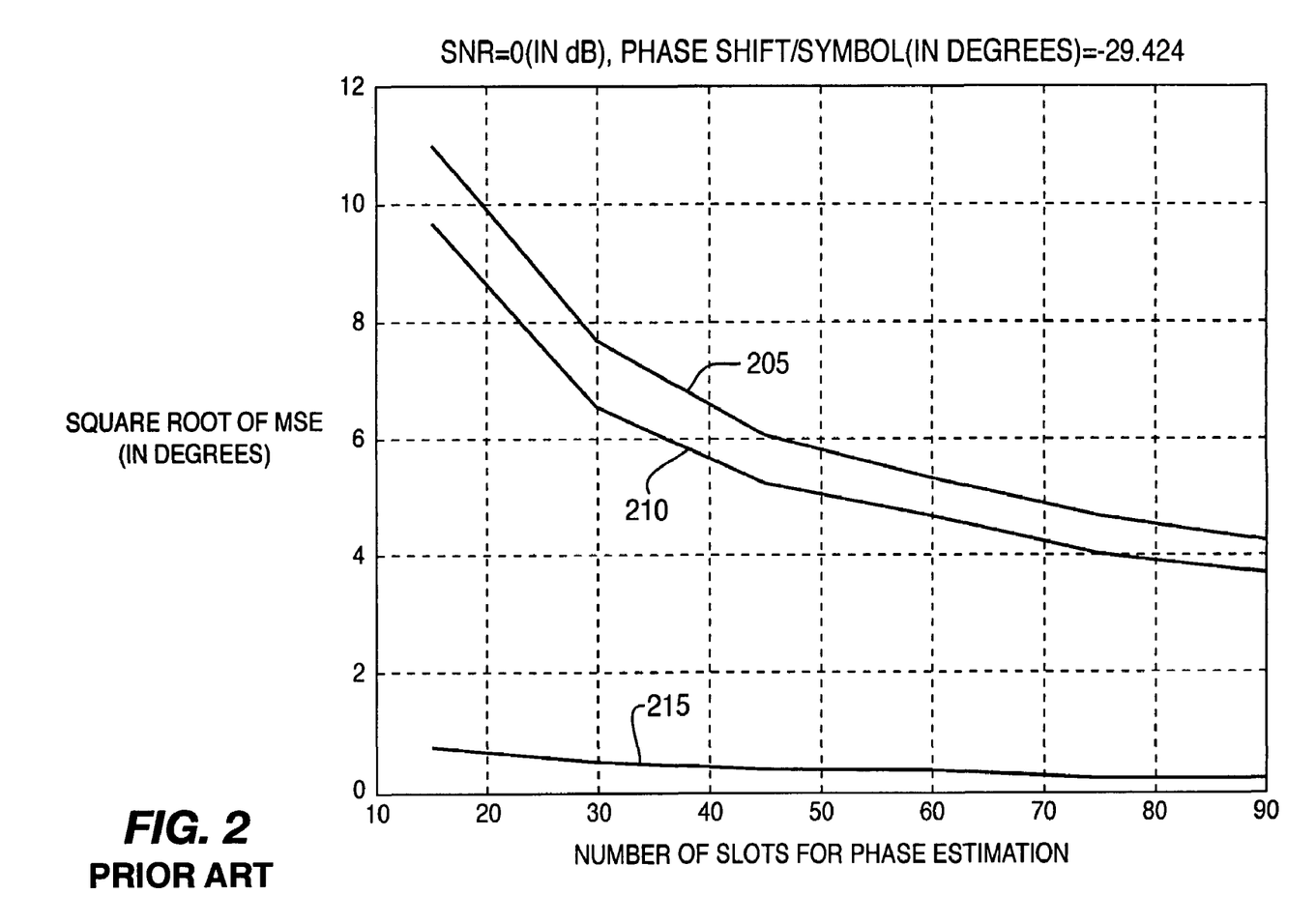
FIG. 2 illustrates the phase estimation performance of three prior art algorithms.

FIG. 2 shows three prior art simulated phase shift estimation algorithms 205, 210, 215, using the square root of the phase Mean Square Errors (MSEs) of three estimators at a Signal-to-Noise Ratio (SNR) of 0 dB.

A first prior art algorithm 205 supposes that $r_{k,j}$ is the $j^{th}$ despread pilot symbol at the kth slot. The phase shift (difference) θ between two adjacent pilot symbols can be estimated, θ, by Equation 1 as follows:

$$\hat{\theta} = \text{angle}\left\{\sum_{k=1}^{N_1}\sum_{j=1}^{N_2-1} r_{k,j+1} r^*_{k,j}\right\} \quad \text{Equation 1}$$

where $N_1$ is the number of slots used for the phase shift estimation, and $N_2$ is the number of pilot symbols per slot used for the phase shift estimation.

A second prior art algorithm 210 estimates the phase difference of two pilot symbols that are separated by one symbol and divides it by two, and is expressed by Equation 2 as follows:

$$\hat{\theta} = \frac{1}{2}\text{angle}\left\{\sum_{k=1}^{N_1}\sum_{j=1}^{N_2-2} r_{k,j+2} r^*_{k,j}\right\} \quad \text{Equation 2}$$

from the performance point of view, the larger the separation of two pilot symbols, the better the performance. But there is a limitation on the separation, which is the number of pilot symbols per slot. If the separation is too large, the system will not know how many phase rotations occurred, which will cause errors. Therefore the minimum number of pilot symbols is three per slot and two pilot symbols that are separated by more than one symbol cannot be used.

A third prior art algorithm 215 estimates the phase shift by using two pilot symbols separated by one slot. The phase shift over one slot estimation, $\theta_0$, is shown by Equation 3 as follows:

$$\hat{\theta}_0 = \text{angle}\left\{\sum_{k=1}^{N_1-1}\sum_{j=1}^{N_2} r_{k+1,j} r^*_{k,j}\right\} \quad \text{Equation 3}$$

where $-180° < \hat{\theta}_0 \leq 180°$. Since the phase shift over one slot is in the range of $-295° \leq 10*\theta \leq 295°$, there are ambiguities to estimating $\theta$ from $\hat{\theta}_0$. The values for $\hat{\theta}_0$ can be found in Table 1.

$$\hat{\theta} = \begin{cases} \frac{1}{10}\hat{\theta}_0 & |10*\theta| \leq 180° \\ \frac{1}{10}(\hat{\theta}_0 + 360°) & \theta > 0, \hat{\theta}_0 < 0 \\ \frac{1}{10}(\hat{\theta}_0 - 360°) & \theta < 0, \hat{\theta}_0 > 0 \end{cases}$$

The sign of $\theta$ is assumed to be known, and thus there is no ambiguity of prior art algorithm 215. The number of pilot symbols per slot is equal to 3. It is found that prior art algorithm 205 is the least effective and prior art algorithm 215 performs best, as expected.

The above prior art algorithms each have at least one problem. Prior art algorithm 215 outperforms prior art algorithms 205 and 210, but has phase ambiguity problems and cannot be used. Prior art algorithms 205 and 210 introduce a high noise variance.

Therefore new algorithms are needed which have better performance than the prior art algorithms 205 and 210, and which do not have the phase ambiguities of prior art algorithm 215. In addition, it would be desirable to these new algorithms produce complex weights needed for Rake reception that are less processor and memory intensive.

SUMMARY

A channel estimation method which reduces the strain on the resources of a Rake receiver using a CWG algorithm, and estimates and corrects frequency offset between Node B and the WTRU without the phase ambiguities or high noise variance of prior art algorithms.

In one embodiment, a non-adaptive algorithm is used to average blocks of pilot symbols from several slots. In another embodiment, an adaptive algorithm implements sliding window averaging or a recursive filter. Using a CWG algorithm reduces the memory and processor requirements of the Rake receiver.

BRIEF DESCRIPTION OF THE DRAWINGS

A more detailed understanding of the invention may be had from the following description of a preferred embodiment, to be understood in conjunction with the accompanying drawing wherein.

DETAILED DESCRIPTION OF THE PREFERRED EMBODIMENTS

The present invention is described with reference to the drawing figures wherein like numerals represent like elements throughout. The embodiments of the present invention can be applied to any Rake receiver, such as used in a wireless transmit/receive unit (WTRU) or a base station.

Hereafter, a WTRU includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment. The preferred implementation is for use in receiving downlink common channels, although the features of the preferred embodiments can be applied to various implementations.

For illustrative purposes, the preferred embodiments are described in conjunction with a Dedicated Physical Common CHannel (DPCCH) the 3 GPP wideband CDMA (W-CDMA) Frequency Division Duplex (FFD) mode. However, it can be applied in different channels in various wireless systems.

The DPCCH has pilot symbols, control data symbols, TPC and FBI symbols. Although the following description refers to pilot symbols, any reference signal can be used, such as a midamble sequence.

Figure 3A:
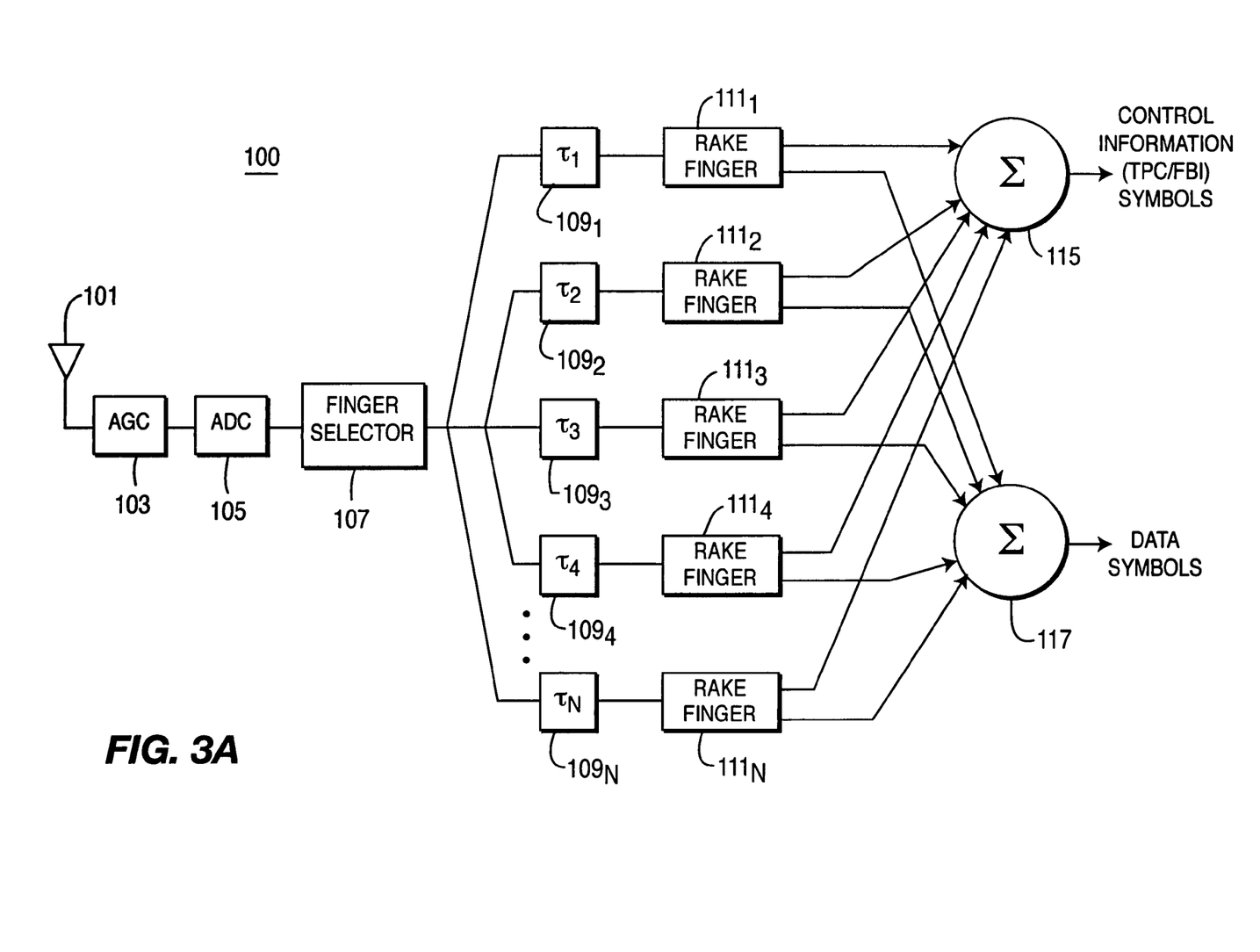
FIG. 3A is a block diagram of a Rake receiver configured in accordance with the present invention.

FIG. 3A illustrates a block diagram of a Rake receiver 100 operating in accordance with the present invention. Rake receiver 100 includes an antenna 101, an Automatic Gain Circuit (AGC) 103, an Analog to Digital Converter (ADC) 105, a Rake finger selector circuit 107, a plurality of delay elements $109_1, 109_2, 109_3, 109_4 \ldots 109_N$, a plurality of Rake fingers $111_1, 111_2, 111_3, 111_4 \ldots 111_N$, and the previously mentioned combiners 115 and 117. A spread modulation signal is received at the antenna 101 and is applied to the AGC 103, where the signal is amplified and conditioned. The output of the AGC 103 is input to the ADC 105 where the spread modulation signal is converted to a digital signal which is presented to the finger selector 107. The Rake finger selector 107 feeds the digital signal to the delay elements 109, the outputs of which are connected to a respective Rake finger 111. Each delay element 109 is set to delay the signal for a particular period of time that the delay provided by any of the other respective delay elements 109.

As shown in FIG. 3A, each Rake finger 111 in Rake receiver 100 has two outputs, one being connected to combiner 115 and the other connected to combiner 117. The Rake receiver 100 outputs two data streams in parallel.

Combiner 115 outputs a control information data stream, such as Transmit Power Control (TPC) and FeedBack Information (FBI) used for closed loop transmission diversity. Combiner 117 outputs a signal information data stream including detected data symbols.

Figure 3B:
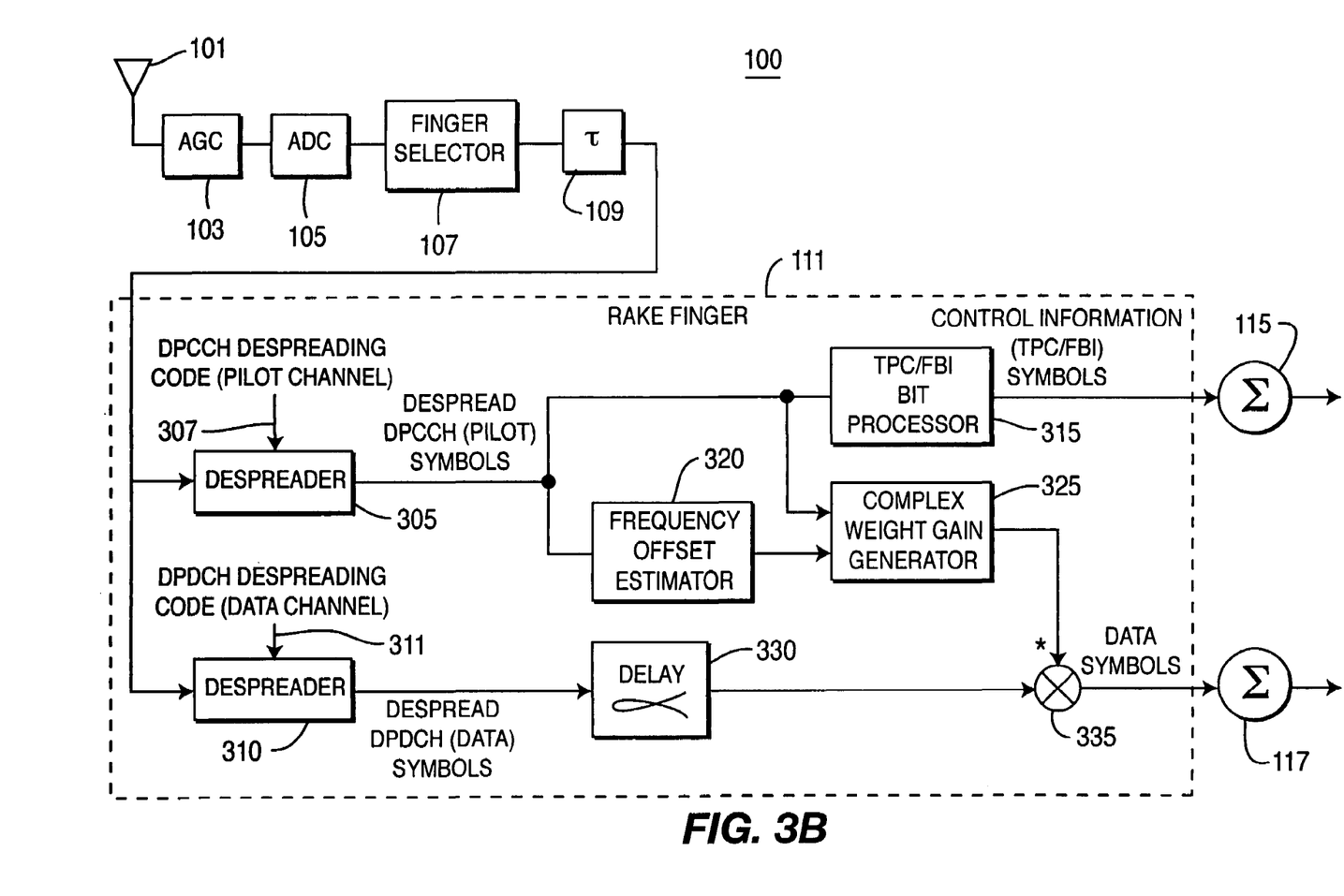
FIG. 3B is a block diagram showing the detailed configuration of the Rake Fingers used in the Rake receiver of FIG. 3A in accordance with a preferred embodiment of the present invention.

FIG. 3B illustrates an exemplary configuration of the Rake finger 111 used in Rake receiver 100 in accordance with a preferred embodiment of the present invention. The Rake receiver 100 and/or the Rake finger 111 may be incorporated into an integrated circuit (IC) or be configured in a circuit comprising a multitude of interconnecting components.

As shown in FIG. 3B, the inventive Rake finger 111 of Rake receiver 300 includes despreaders 305, 310, a TBC/FBI bit processor 315, a frequency offset estimator 320, a complex weight gain generator 325, an alpha delay element 330 and a demodulator (or complex multiplier) 335. Each of despreaders 305, 310 receive an input signal from delay element 109. Additionally, despreader 305 receives a second input signal consisting of a pilot channel (e.g., DPCCH) despreading code and despreader 310 receives a second input signal consisting of a data channel (e.g., dedicated physical data channel (DPDCH)) code.

The despreader 305 outputs despread pilot symbols which are applied to the inputs of TPC/FBI bit processor 315, frequency offset estimator 320 and complex weight gain generator 325. The output of frequency offset estimator 320 provides a second input to complex weight gain generator 325, which produces complex weight values by filtering the despread pilot (e.g., DPCCH) symbols received from the output of despreader 305.

The despreader 310 outputs despread data (e.g., DPDCH) symbols which are applied to the input of the alpha delay element 330 to ensure that data timing is aligned when the despread data symbols are multiplied by the complex weight values at demodulator 335. Thus, significant signal delays introduced by the frequency offset estimator 320 and complex weight gain generator 325 are eliminated.

The output of the demodulator 335 consists of weighted despread data symbols which are added to weighted despread data symbols from other Rake fingers 111 via combiner 117, as shown in FIG. 3A. For example, if the data received at a particular Rake finger 111 does not have a strong correlation to the expected signal, the corresponding complex weight values provided by the complex weight gain generator 325 will approach zero. Thus, the demodulator 335 would essentially null out the signal at this particular Rake finger 111, and would apply little or no effect on the summation implemented at combiner 117.

On the other hand, if there is a strong correlation between the expected signal and the data received at the particular Rake finger 111, the complex weight values provided by the complex weight gain generator 325 would be relatively high. Thus, the output of demodulator 335 would be considerable at this particular Rake finger 111, thus having a significant effect on the summation implemented at combiner 117.

A time and frequency shift occurs using the frequency offset estimator 320 in response to an uplink transmission in a Universal Mobile Telecommunications System (UMTS) frequency division duplex (FDD) system, e.g., due to the speed of a vehicle. For example, when an automobile is traveling at a constant 250 kms/hr (155 mph), a WTRU will experience a 0.613 ppm variation. Therefore, for this large frequency shift between the WTRU transmitter and node B receiver, there will be about 29.5 degree phase shift over one pilot symbol or over 256 chips. This degree of phase shift causes severe performance degradation within a Rake receiver. However, it is possible to estimate it and compensate for it in the CWG process since this phase shift is due to a constant frequency offset.

The CWG process required by the complex multiplier 335 puts a strain on the system resources of Rake receiver 300. For example, CWG algorithms requires large processor and memory usage. One way to reduce the strain on the system resources is to reduce size of the sliding window in the CWG algorithm and thereby reduce the memory and processor requirements.

Figure 4:
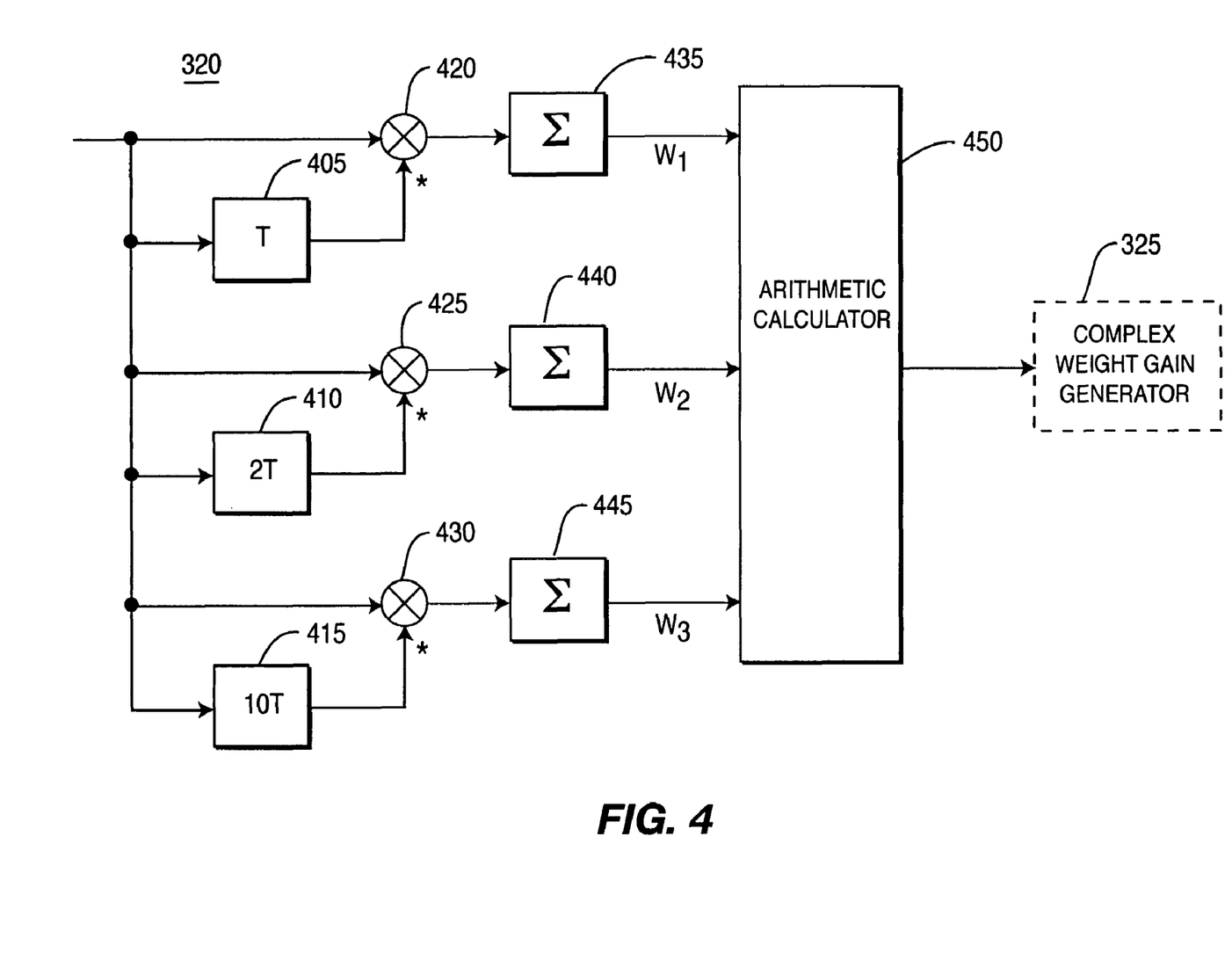
FIG. 4 illustrates the implementation block diagram of the estimation algorithm operating in accordance with one embodiment of the present invention.

FIG. 4 shows the block diagram of a frequency offset estimator 320. The signal from the common channel despreader 305 is applied to the inputs of delay elements 405, 410, 415, and to a first input of each of complex multipliers 420, 425, 430, respectively. One illustrative value for the delays is one chip (T), two chips (2T) and ten chips (10T). The outputs of the delay elements 405, 410, 415 are applied to a second input of each of the complex multipliers 420, 425, 430, respectively. The output of the multipliers 420, 425, 430 are applied to summers 435, 440, 445, respectively. The outputs of the summers 435, 440, 445 are then applied to arithmetic calculator 450. The output of arithmetic calculator 450 is then used as an input to the complex weight gain generator 325.

The first sample $w_1$ estimates the phase difference of adjacent pilot symbols and is shown in Equation 4 as follows:

$$w_1 = \sum_{k=1}^{N_1} \sum_{j=1}^{N_2-1} r_{k,j+1} r_{k,j}^* \qquad \text{Equation 4}$$

where $N_1$ is the number of slots used for the phase shift estimation, $N_2$ is the number of pilot symbols per slot used for the phase shift estimation, and $r_{k,j}$ is the jth despread pilot symbol at kth slot.

The second sampling $w_2$ estimates the phase difference of two pilot symbols that are separated by one symbol and is shown in Equation 5 as follows:

$$w_2 = \sum_{k=1}^{N_1} \sum_{j=1}^{N_2-2} r_{k,j+2} r_{k,j} \qquad \text{Equation 5}$$

where $N_1$ is the number of slots used for the phase shift estimation, $N_2$ is the number of pilot symbols per slot used for the phase shift estimation, and $r_{k,j}$ is the $j^{th}$ despread pilot symbol at $k^{th}$ slot.

The third sample $w_3$ estimates the phase shift using two pilot symbols separated by one slot and is shown in Equation 6 as follows:

$$w_3 = \sum_{k=1}^{N_1-1} \sum_{j=1}^{N_2} r_{k+1,j} r_{k,j}^* \qquad \text{Equation 6}$$

where $N_1$ is the number of slots used for the phase shift estimation, $N_2$ is the number of pilot symbols per slot used for the phase shift estimation, and $r_{k,j}$ is the $j^{th}$ despread pilot symbol at the $k^{th}$ slot.

For a given phase estimation resolution Δ, let $$N = \frac{\theta_{max}}{\Delta};$$

the result is shown in Equation 7 as follows:

$$F(k) = Re(w_1 * e^{-j*k\Delta} + w_2 * e^{-j*k*\Delta*2} + w_3 * e^{-j*k*\Delta*10})  \quad \text{Equation 7}$$

where, $-N \leq k \leq N$; search such a $k_{opt}$ that maximizes F(k), i.e., $$F(k_{opt}) = \max_{-N \leq k \leq N} F(k),$$

where Re(•) is the real part, then $\theta = k_{opt} * \Delta$.

Figure 5:
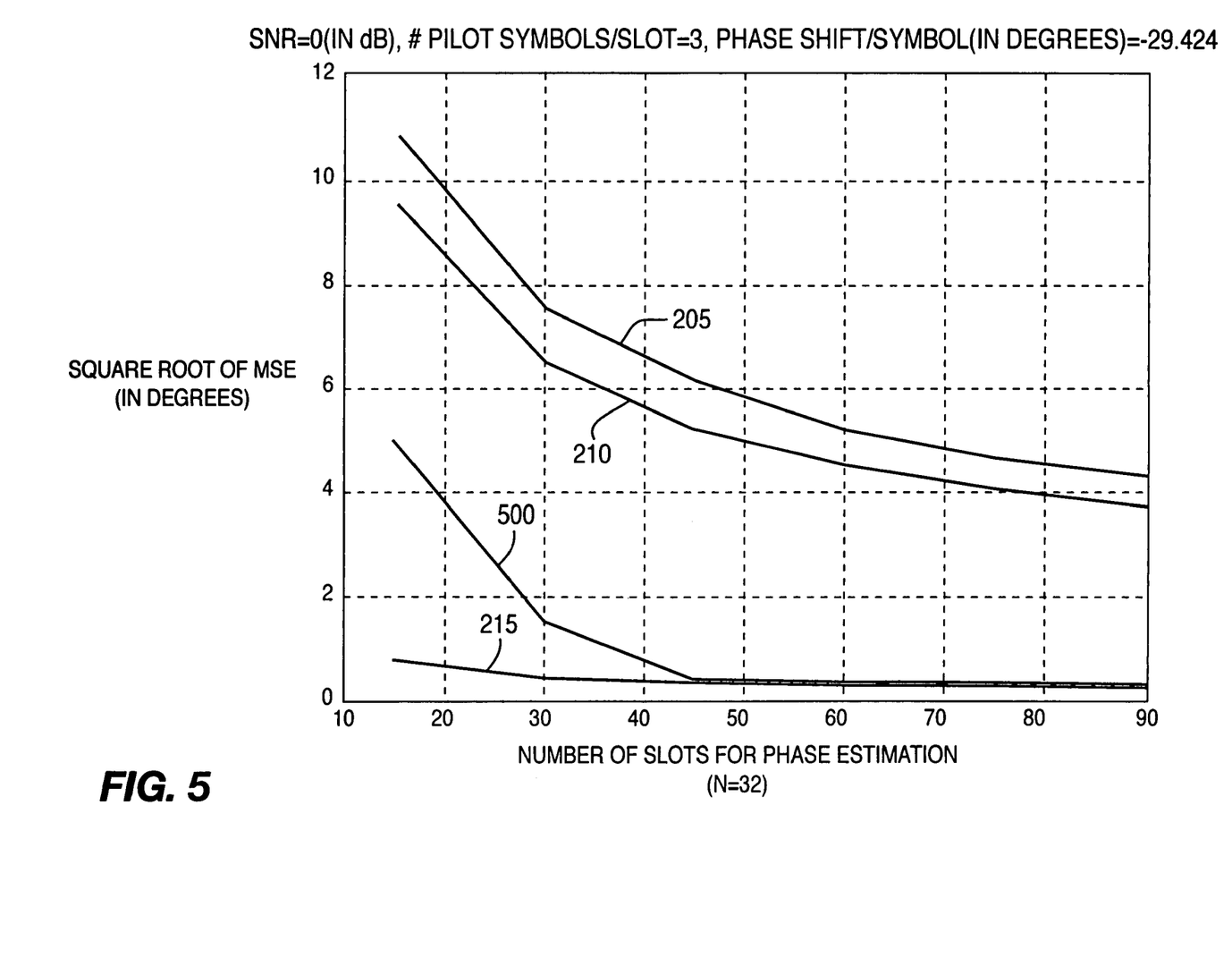
FIG. 5 graphically compares the simulation results obtained using prior art algorithms with an estimation algorithm for an SNR of 0 dB using an N value equal to 32 in accordance with the present invention.
Figure 6:
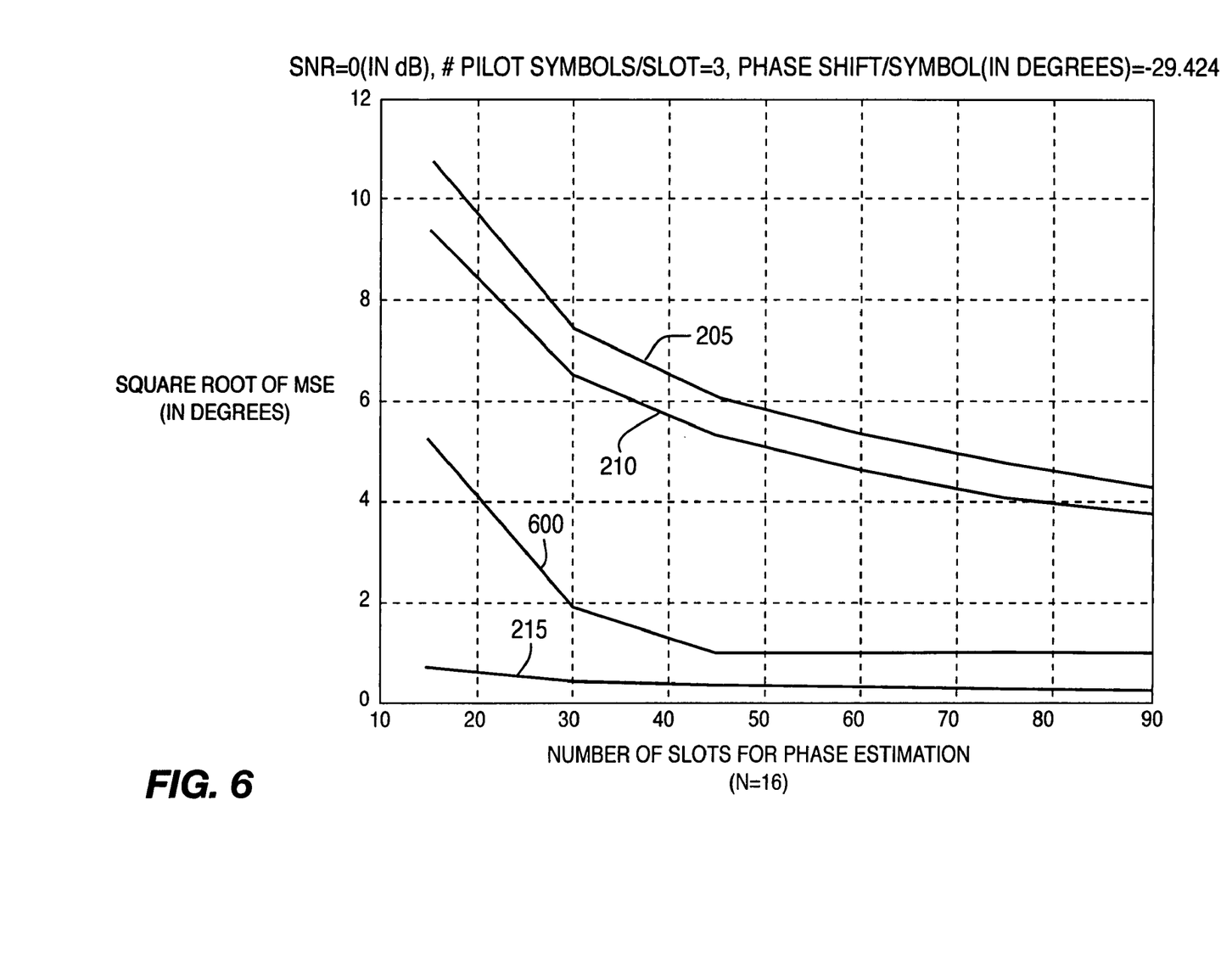
FIG. 6 graphically compares the simulation results obtained using prior art algorithms with an estimation algorithm for an SNR of 0 dB using an N value equal to 16 in accordance with the present invention.

FIG. 5 shows the simulation results obtained with the above algorithm for an SNR of 0 dB. The number of pilot symbols per slot is 3. The parameter N is set 32, which corresponds to a phase resolution of 0.92 degrees. An algorithm 500, operating in accordance with one embodiment of the present invention, performs much better than the prior art algorithms 205 and 210, and performs almost identical to prior art algorithm 215 when the number of slots used for phase estimation is larger than 45. The algorithm 500 performs less effectively than the algorithm 215 for frames with smaller numbers of slots. However, the algorithm 215 uses the information of the sign of θ, which is not known in practice, and therefore it cannot be utilized in real life FIG. 6 shows similar simulation results as those in FIG. 5, but instead uses an N value equal to 16, which corresponds to a phase resolution of 1.84 degrees. An algorithm 600, operating in accordance with another embodiment of the present invention, also outperforms prior art algorithms 205 and 210 and has results similar to the prior art algorithm 215 when the number of slots used for phase estimation is larger than 45.

The algorithm of the present invention can be reduced in complexity to maximize the cost function. Reducing one term at a time produces the following Equations 8, 9 and 10 as follows:

$$F_1(k) = Re(w_2 * e^{-j*k*\Delta*2} + w_3 * e^{-j*k*\Delta*10}) \quad \text{Equation 8}$$

$$F_2(k) = Re(w_1 * e^{-j*k*\Delta} + w_3 * e^{-j*k*\Delta*10}) \quad \text{Equation 9}$$

$$F_3(k) = Re(w_1 * e^{-j*k*\Delta} + w_2 * e^{-j*k*\Delta*2}) \quad \text{Equation 10}$$

The performances of these reduced-complexity algorithms have been simulated and it was found that the Equation 8 provides the smallest performance degradation. To further reduce complexity the calculation of the function F(k) can take advantage of the symmetrical property of F(k), which saves half of the multiplications normally required, which is shown in Equation 11 as follows:

$$Re(w^* e^{\mp j*k*\delta}) = w_r * \cos(k*\delta) \pm w_i * \sin(k*\delta) \quad \text{Equation 11}$$

where $w = w_r + j w_i$.

Figure 7:
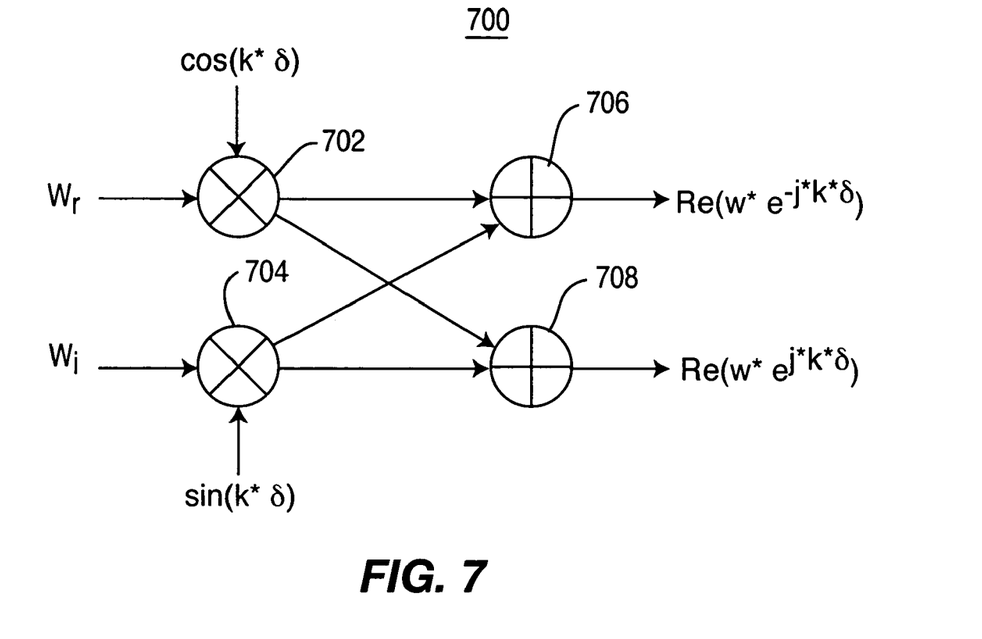
FIG. 7 shows an implementation of a cost function operating in accordance with the present invention.

FIG. 7 shows an implementation 700 of the cost functions $Re(w^* e^{\mp j*k*\delta})$ of Equation 11. $w_r$ is multiplied with cos (k*δ) by multiplier 702. $w_i$ is multiplied with sin (k*δ) by multiplier 704. The resulting products of multipliers 702 and 704 are added together by adder 706, producing $Re(w^* e^{-j*k*\delta})$. The result of multiplier 704 is subtracted from the result of multiplier 702 by subtractor 708, producing $Re(w^* e^{j*k*\delta})$.

The method of the present invention uses decision-feedback (DF) techniques implemented with a sliding window CWG algorithm implemented by complex weight gain generator 325 in FIG. 3.

By using DF, both the pilot symbols and DPCCH data symbols can be used for channel estimation, reducing the required window size. Simulation results show that the DF approach can be used to shorten the window size of CWG algorithm.

The sliding window CWG algorithm of the present invention, first averages all pilot symbols in the sliding window as tentative channel gain estimation and then uses this tentative channel gain to demodulate the data symbols in the sliding window. After removing the demodulated information from the data symbols, the CWG algorithm sums all pilot symbols and de-rotated data symbols as final channel gain estimation.

The performance of sliding window CWG algorithm with DF was simulated for the Additive White Gaussian Noise (AWGN) channel with speeds of 3, 60, 120 and 250 km/hr. For comparison, the sliding window CWG algorithm without DF was also simulated, but its window size is twice as much as that used by the CWG with DF. It was found that the CWG with DF and with a K equal to five provides a tradeoff between the performance and implementation memory. However, when compared with CWG with a K equal to five without DF, the CWG with a K equal to five and with DF always provides the better performance.

Comparing a first CWG with a K equal to 10 without DF to a second CWG with a K equal to 5 with DF, the CWG with a K equal to 5 and DF provided similar performance for the AWGN channel and better performance in the Rayleigh fading channel at high speed of 250 km/hr. The CWG with a K equal to 5 and DF exhibited performance derogation when the speed is slow.

To collect more data regarding the sliding window size and the performance degradation, more simulations have been made. Three sets of tests were performed, the first set the number of symbols for buffering at two, the second set is three and the third set at four. Each set simulated vehicle speeds of 3 km/hr, 60 km/hr, 120 km/hr and 250 km/hr, and utilized the AWGN and fading channels.

From the above simulations, it can be concluded that there is a tradeoff between performance and memory size. The larger the memory, the better the performance. Table 2 shows the performance and the shortened sliding window size The top horizontal row indicates the channel type. The left vertical column indicates whether it is a sliding window or a shortened sliding window algorithms and the K values. The values in the appropriate row and column indicate the root MSE (RMSE) of the different CWG algorithms at an SNR of 0 dB.

TABLE 2

|  | AWGN channel | Fading channel, 3 km/hr | Fading channel, 60 km/hr | Fading channel, 120 km/hr | Fading channel, 250 km/hr |
| --- | --- | --- | --- | --- | --- |
| Sliding Window K = 10, No DF | 0.30 | 0.30 | 0.30 | 0.30 | 0.47 |
| Sliding Window K = 5, with DF | 0.30 | 0.35 | 0.35 | 0.35 | 0.40 |

TABLE 2-continued

| | AWGN channel | Fading channel, 3 km/hr | Fading channel, 60 km/hr | Fading channel, 120 km/hr | Fading channel, 250 km/hr |
|---|---|---|---|---|---|
| Shortened sliding window K = 2, with DF | 0.45 | 0.48 | 0.48 | 0.48 | 0.52 |
| Shortened sliding window K = 3, with DF | 0.38 | 0.42 | 0.42 | 0.42 | 0.43 |
| Shortened sliding window K = 4, with DF | 0.35 | 0.38 | 0.38 | 0.38 | 0.43 |

In addition to the method of deploying the complex weights using a DF algorithm, an embodiment of the present embodiment discloses a hybrid filter-predictor-type CWG algorithm with DF. This algorithm is targeted to achieve a compromise between the performance and implementation memory requirement. This algorithm utilizes future symbols.

The hybrid CWG algorithm first averages all pilot symbols in a sliding window as tentative channel gain estimation, where the sliding window is in the range $-K1$ to $+K2$, where K2 is the number of old symbols and K1 is the number of future symbols. For exemplary purposes, K1 is less than or equal to three.

The CWG uses tentative channel gain to demodulate the data symbols in the sliding window. First, all information is demodulated and removed from the data symbols. The CWG algorithm filters all pilot symbols and the de-rotated data symbols and outputs the filtered result as a final channel gain estimation.

Two filters are considered here, the first one has the linear function coefficients ($\{c_0, c_0+\Delta, \ldots, c_0+(K_1+K_2)\Delta\}$) and the second has the exponential coefficients ($\{\alpha^{K_1+K_2}, \ldots, \alpha, 1\}$).

Figure 8:
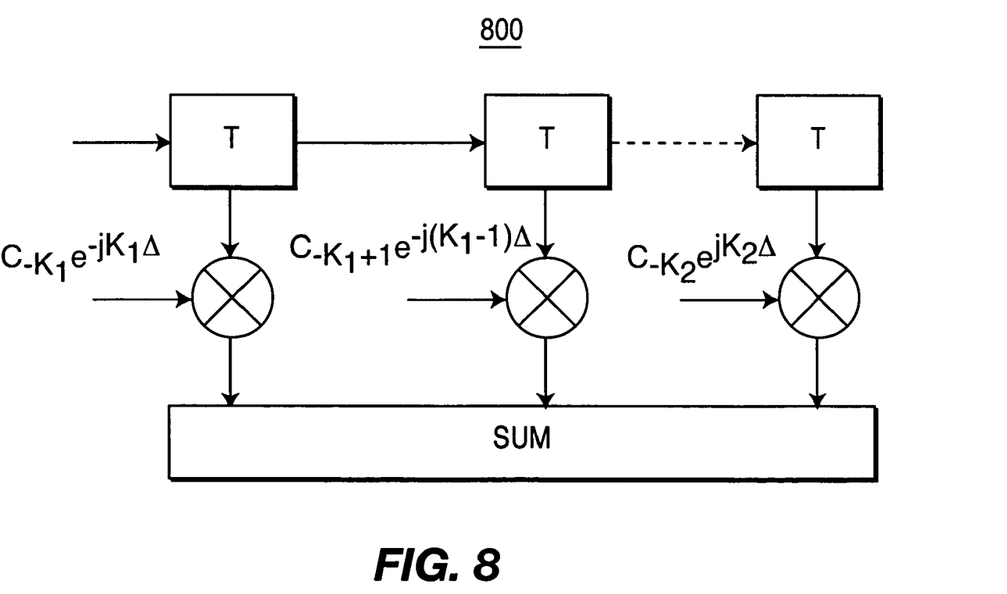
FIG. 8 shows an implementation of a filter used in conjunction with a CWG algorithm operating in accordance with the present invention.

The CWG algorithm essentially serves the function of a filter 800 shown in FIG. 8. Filter 800, which may be implemented by a CWG algorithm running within complex weight gain generator 325, has $K_1+K_2+1$ filter coefficients as $\{C_{-K_1}, C_{-K_1+1}, \ldots, C_{-1}, C_0, \ldots, C_{K_2}\}$ and the phase shift from one symbol to the next one is $\Delta$ due to the frequency offset that is estimated by frequency offset estimator 320. The output of filter 800 is represented by Equation 12 as follows:

$$W_n = r_{n+K_1} C_{-K_1} e^{-jK_1\Delta} + \ldots + r_{n+1} C_{-1} e^{-j\Delta} + r_n C_0 + \ldots + r_{n-K_2} C_{K_2} e^{jK_2\Delta} \quad \text{Equation 12}$$

As shown in FIG. 8, filter 800 has $K_1$ leading taps for future symbols and $K_2$ lagging taps for past symbols. Each element "T" represents a delay box with one symbol delay and the DPDCH path is delayed by $K_1$ symbols for timing alignment. The input to the filter 800 is the despread symbol stream $r_{n+K_1}, \ldots, r_{n+1}, r_n, \ldots, r_{n-K_2}$. The coefficients can be predetermined or adaptively changed. To achieve best effect, these coefficients should be changed according to vehicle speed.

Sliding window CWG algorithms with and without DF were simulated for comparison. For the non-DF sliding window CWG algorithm, its window size is twice as much as the CWG with DF. The channels are the AWGN and the fading channels. The speeds are 3 km/hr, 60 km/hr, 120 km/hr and 250 km/hr. The mean square errors (MSE) between the real channel gain and estimated channel gain are then calculated. The linear hybrid CWG algorithm uses the linear coefficients with $c_0=\{0, 0.2, 0.4, 0.6, 0.8\}$ and $c_0+(K_1+K_2)\Delta=1$.

The exponential hybrid CWG algorithm uses the exponential coefficients $\{\alpha^{K_1+K_2}, \ldots, \alpha, 1\}$ with an $\alpha=\{0.7, 0.8, 0.9\}$.

Several simulations of the various algorithms were then run while K2 and K1 were varied. The linear hybrid CWG algorithm using K2 equal to eight and K1 equal to two with the AWGN channel and fading channels with vehicle speed of 3 km/hr, 60 km/hr, 120 km/hr and 250 km/hr. K1 and K2 were incremented by one and the simulations were again performed.

The K2 was then set equal to eight and K1 equal to two and the exponential hybrid CWG algorithm was performed with the AWGN channel and fading channels with vehicle speed of 3 km/hr, 60 km/hr, 120 km/hr and 250 km/hr. K1 and K2 were incremented and the simulations were performed again.

Table 3 shows the performance comparison between different CWG algorithms. Two CWG algorithms are used for reference. One is the CWG algorithm with a K equal to ten (10-symbol data buffering) without DF, the other is the CWG algorithm with a K equal to five (5-symbol data buffering) with DF. The top horizontal row indicates the channel type. The left vertical column indicates whether it is a sliding window, the hybrid linear coefficients or the hybrid exponential coefficients. The values in the appropriate row and column indicate the RMSE of the different CWG algorithms at an SNR of 0 dB.

TABLE 3

| | AWGN channel | Fading channel, 3 km/hr | Fading channel, 60 km/hr | Fading channel, 120 km/hr | Fading channel, 250 km/hr |
|---|---|---|---|---|---|
| Reference 1: Sliding Window K = 10, No DF | 0.30 | 0.30 | 0.30 | 0.30 | 0.47 |
| Reference 2: Sliding Window K = 5, with DF | 0.30 | 0.35 | 0.35 | 0.35 | 0.40 |
| Hybrid K1 = 2, linear coefficients | 0.32 | 0.35 | 0.35 | 0.37 | 0.50 |
| Hybrid K1 = 3, linear coefficients | 0.31 | 0.34 | 0.34 | 0.36 | 0.45 |
| Hybrid K1 = 2, Exponential coefficients | 0.35 | 0.38 | 0.38 | 0.38 | 0.47 |
| Hybrid K1 = 3, Exponential coefficients | 0.35 | 0.37 | 0.37 | 0.38 | 0.45 |

The following conclusions are based on the results from Table 3. The linear coefficient filter is better than the exponential coefficient filter. The linear coefficient filter with a K1 equal to three provides slightly improved performance than with a K1 equal to two. The CWG with a K equal to five is slightly better than the linear coefficient filter with a K1 equal to two.

While this invention has been particularly shown and described with reference to preferred embodiments, it will be understood by those skilled in the art that various changes in form and details may be made therein without departing from the scope of the invention as described hereinabove.

What is claimed is:

1. A method of employing a Rake receiver in a wireless radio access system to a radio uplink link which results in a significant increase in data transference in a spread modulation signal, the method comprising:
   (a) receiving a spread modulation signal and presenting it to a plurality of Rake fingers, wherein each Rake finger processes the spread modulation signal, each Rake finger delaying the spread modulation signal by a differing amount of time;
   (b) multiplying the delayed spread modulation signal with a first reference signal producing a control bit signal;
   (c) multiplying the delayed spread modulation signal with a second reference signal producing a data signal;
   (d) delaying said data signal producing a delayed data signal;
   (e) multiplying said delayed data signal with weights produced by a frequency offset estimator and a complex weight gain generator to produce a first set of data; and
   (f) summing the outputs of all of the Rake fingers, producing data symbols and control bit symbols.

2. The method of claim 1 wherein the frequency offset estimator performs a frequency offset estimation determined by averaging blocks of pilot signals.

3. The method of claim 2 wherein said frequency offset estimation is determined using a sliding window averaging algorithm.

4. The method of claim 2 wherein said frequency offset estimation is determined using a recursive filter.

5. A Rake receiver used in a wireless communications system, the Rake receiver comprising:
   (a) means for receiving a spread modulation signal and presenting it to a plurality of Rake fingers, wherein each Rake finger processes the spread modulation signal, each Rake finger delaying the spread modulation signal by a differing amount of time;
   (b) means for multiplying the delayed spread modulation signal with a first reference signal producing a control bit signal;
   (c) means for multiplying the delayed spread modulation signal with a second reference signal producing a data signal;
   (d) means for delaying said data signal producing a delayed data signal;
   (e) means for multiplying said delayed data signal with weights produced by a frequency offset estimator and a complex weight gain generator to produce a first set of data; and
   (f) means for summing the outputs of all of the Rake fingers, producing data symbols and control bit symbols.

6. The receiver of claim 5 wherein the frequency offset estimator performs a frequency offset estimation determined by averaging blocks of pilot signals.

7. The receiver of claim 6 wherein said frequency offset estimation is determined using a sliding window averaging algorithm.

8. The receiver of claim 6 wherein said frequency offset estimation is determined using a recursive filter.

9. A wireless receiver/transmitter unit (WTRU) used in a wireless communications system, comprising:
   (a) means for receiving a spread modulation signal and presenting it to a plurality of Rake fingers, wherein each Rake finger processes the spread modulation signal, each Rake finger delaying the spread modulation signal by a differing amount of time;
   (b) means for multiplying the delayed spread modulation signal with a first reference signal producing a control bit signal;
   (c) means for multiplying the delayed spread modulation signal with a second reference signal producing a data signal;
   (d) means for delaying said data signal producing a delayed data signal;
   (e) means for multiplying said delayed data signal with weights produced by a frequency offset estimator and a complex weight gain (CWG) generator to produce a first set of data; and
   (f) means for summing the outputs of all of the Rake fingers, producing data symbols and control bit symbols.

10. The WTRU of claim 9 wherein the frequency offset estimator performs a frequency offset estimation determined by averaging blocks of pilot signals.

11. The WTRU of claim 10 wherein said frequency offset estimation is determined using a sliding window averaging algorithm.

12. The WTRU of claim 10 wherein said frequency offset estimation is determined using a recursive filter.

13. A Rake receiver used in a wireless communications system, the Rake receiver comprising:
   (a) a first combiner;
   (b) a second combiner; and
   (c) a plurality of Rake fingers for receiving and processing a spread modulation signal, each Rake finger comprising:
      (i) a first despreader having a first input for receiving the spread modulation signal, a second input for receiving a pilot signal and an output for outputting despread pilot symbols;
      (ii) a second despreader having a first input for receiving the spread modulation signal, a second input for receiving a data signal and an output for outputting despread data symbols;
      (iii) a data bit processor having an input for receiving the despread pilot symbols and an output for outputting processed pilot symbols to be combined in the first combiner with other similarly processed pilot symbols outputted by other ones of the Rake fingers;
      (iv) a frequency offset estimator having an input for receiving the despread pilot symbols and an output for outputting a frequency offset estimation signal;
      (v) a complex weight gain generator in communication with the output of the first despreader and the output of the frequency offset estimator, the complex weight gain generator having a first input for receiving the despread pilot symbols, a second input for receiving the frequency offset estimation signal, and an output for outputting weighted symbols;
      (vi) a delay element in communication with the output of the second despreader for delaying the despread data symbols, the delay element having an output for outputting the delayed despread data symbols; and
      (vii) a multiplier in communication with the output of the delay element and the output of the complex weight gain generator, the multiplier having a first input for receiving the delayed despread data symbols and a second input for receiving the weighted symbols and outputting processed data symbols to be combined in the second combiner with other similarly processed data symbols outputted by other ones of the Rake fingers.

14. The Rake receiver of claim 13 wherein the pilot signal comprises a dedicated physical common channel (DPCCH).

15. The Rake receiver of claim 14 wherein the first despreader outputs despread DPCCH symbols.

16. The Rake receiver of claim 13 wherein the data signal comprises a dedicated physical data channel (DPDCH).

17. The Rake receiver of claim 16 wherein the second despreader outputs despread DPDCH symbols.

18. The Rake receiver of claim 14 wherein the data bit processor outputs transmit power control (TPC) and feedback information (FBI) used for closed loop transmission diversity.

19. An integrated circuit (IC) which processes spread modulation signals, the IC comprising:
  (a) a first combiner;
  (b) a second combiner; and
  (c) a plurality of Rake fingers for receiving and processing a spread modulation signal, each Rake finger comprising:
   (i) a first despreader having a first input for receiving the spread modulation signal, a second input for receiving a pilot signal and an output for outputting despread pilot symbols;
   (ii) a second despreader having a first input for receiving the spread modulation signal, a second input for receiving a data signal and an output for outputting despread data symbols;
   (iii) a data bit processor having an input for receiving the despread pilot symbols and an output for outputting processed pilot symbols to be combined in the first combiner with other similarly processed pilot symbols outputted by other ones of the Rake fingers;
   (iv) a frequency offset estimator having an input for receiving the despread pilot symbols and an output for outputting a frequency offset estimation signal;
   (v) a complex weight gain generator in communication with the output of the first despreader and the output of the frequency offset estimator, the complex weight gain generator having a first input for receiving the despread pilot symbols, a second input for receiving the frequency offset estimation signal, and an output for outputting weighted symbols;
   (vi) a delay element in communication with the output of the second despreader for delaying the despread data symbols, the delay element having an output for outputting the delayed despread data symbols; and
   (vii) a multiplier in communication with the output of the delay element and the output of the complex weight gain generator, the multiplier having a first input for receiving the delayed despread data symbols and a second input for receiving the weighted symbols and outputting processed data symbols to be combined in the second combiner with other similarly processed data symbols outputted by other ones of the Rake fingers.

20. The IC of claim 19 wherein the pilot signal comprises a dedicated physical common channel (DPCCH).

21. The IC of claim 20 wherein the first despreader outputs despread DPCCH symbols.

22. The IC of claim 19 wherein the data signal comprises a dedicated physical data channel (DPDCH).

23. The IC of claim 22 wherein the second despreader outputs despread DPDCH symbols.

24. The IC of claim 19 wherein the data bit processor outputs transmit power control (TPC) and feedback information (FBI) used for closed loop transmission diversity.

* * * * *

UNITED STATES PATENT AND TRADEMARK OFFICE
CERTIFICATE OF CORRECTION

PATENT NO. : 6,996,160 B2
APPLICATION NO. : 10/718394
DATED : February 7, 2006
INVENTOR(S) : Li et al.

It is certified that error appears in the above-identified patent and that said Letters Patent is hereby corrected as shown below:

ON THE TITLE PAGE

Item (54), Title: Page 1, left column, lines 1-3, and Column 1, Line 1-3 delete Title and insert therefor --CHANNEL GAIN ESTIMATION IN A RAKE RECEIVER--.

IN THE SPECIFICATION

Column 1, lines 2-3, after the word "RECEIVER", delete "USING COMPLEX WEIGHT GENERATION (CWG) ALGORITHMS".

Column 2, line 33, after the word "estimated", delete "$\theta$," and insert therefor --$\hat{\theta}$--.

Column 2, line 66, after the word "estimation", delete "$\theta_0$" and insert therefor --$\hat{\theta}_0$--.

Column 3, line 8, after "-180°", delete "<$\theta_0$," and insert therefor --<$\hat{\theta}_0$--.

Column 3, line 10, after the word "from", delete "$\theta_0$. The values for $\theta_0$" and insert therefor --$\hat{\theta}_0$. The values for $\hat{\theta}_0$--.

Column 3, line 34, after the word "desirable", delete "to" and insert therefor --that--.

Column 4, line 38, after "mon", delete "CHannel" and insert therefor --Channel--.

UNITED STATES PATENT AND TRADEMARK OFFICE
CERTIFICATE OF CORRECTION

PATENT NO. : 6,996,160 B2
APPLICATION NO. : 10/718394
DATED : February 7, 2006
INVENTOR(S) : Li et al.

It is certified that error appears in the above-identified patent and that said Letters Patent is hereby corrected as shown below:

Column 7, line 19, after the word "then", delete "$\theta = k_{opt}*\Delta.$" and insert therefor -- $\hat{\theta} = k_{opt}*\Delta.$ --.

Signed and Sealed this

Seventeenth Day of July, 2007

JON W. DUDAS
*Director of the United States Patent and Trademark Office*